(12) United States Patent
De La Prida Caballero et al.

(10) Patent No.: US 10,661,603 B2
(45) Date of Patent: May 26, 2020

(54) SOLID WHEEL FOR A RAIL VEHICLE AND METHOD FOR PRODUCING THE WHEEL

(71) Applicant: SIEMENS AG OESTERREICH, Vienna (AT)

(72) Inventors: Ruben De La Prida Caballero, Graz (AT); Gerhard Stine, Graz (AT); Andreas Weitenthaler, St. Margarethen bei Knittelfeld (AT); Franz-Josef Weber, Graz (AT)

(73) Assignee: SIEMENS MOBILITY AUSTRIA GMBH, Vienna (AT)

( * ) Notice: Subject to any disclaimer, the term of this patent is extended or adjusted under 35 U.S.C. 154(b) by 117 days.

(21) Appl. No.: 15/570,049

(22) PCT Filed: Mar. 3, 2016

(86) PCT No.: PCT/EP2016/054529
§ 371 (c)(1),
(2) Date: Oct. 27, 2017

(87) PCT Pub. No.: WO2016/173749
PCT Pub. Date: Nov. 3, 2016

(65) Prior Publication Data
US 2018/0111415 A1 Apr. 26, 2018

(30) Foreign Application Priority Data

Apr. 30, 2015 (AT) .............................. A 50349/2015

(51) Int. Cl.
*B60B 17/00* (2006.01)
(52) U.S. Cl.
CPC ........ *B60B 17/001* (2013.01); *B60B 17/0068* (2013.01); *B60B 2310/202* (2013.01);
(Continued)

(58) Field of Classification Search
CPC ... B60B 17/00; B60B 17/0006; B60B 17/001; B60B 17/0013
See application file for complete search history.

(56) References Cited

U.S. PATENT DOCUMENTS 280,702 A * 7/1883 Willits .................... B60B 17/00
295/25
464,527 A * 12/1891 Smith .................. B60B 17/0055
295/15
(Continued)

FOREIGN PATENT DOCUMENTS

DE           705616      5/1941
DE       102007001088    8/2008
(Continued)

*Primary Examiner* — Jason R Bellinger
(74) *Attorney, Agent, or Firm* — Cozen O'Connor

(57) ABSTRACT

A solid wheel for a rail vehicle includes a wheel rim arranged on the circumference of the solid wheel, a tread and a hub for a wheelset shaft, wherein the wheel rim is connected to the hub via an end wall and a rear wall, where the hub is arranged at the center of the solid wheel and includes a longitudinal axis such that a high radial and axial strength of the wheel flange as the basis for a low sound emission is provided by virtue of the solid wheel forming a cavity that is delimited by the end wall and the rear wall, where the end wall and the rear wall transition into each other below the wheel flange in an arched manner, and the end wall has first openings and the rear wall has second openings in order to open the cavity outwards in a spoked manner.

40 Claims, 6 Drawing Sheets

(52) U.S. Cl.
CPC ....... *B60B 2310/54* (2013.01); *B60B 2360/10* (2013.01); *B60B 2900/133* (2013.01)

(56) References Cited

U.S. PATENT DOCUMENTS

| | | | | |
|---|---|---|---|---|
| 479,722 | A | * | 7/1892 | Rundquist-Wanner ....................... B60B 17/002 295/28 |
| 2,042,160 | A | * | 5/1936 | Pflager ................ B60B 17/0006 295/27 |
| 2,106,566 | A | * | 1/1938 | Hallquist .............. B60B 17/002 295/28 |
| 2,212,098 | A | * | 8/1940 | Heilig ................... B60B 17/002 295/28 |
| 2,262,004 | A | * | 11/1941 | Jabelmann ............ B60B 17/002 295/28 |
| 6,009,980 | A | * | 1/2000 | Hester ....................... B23P 9/04 188/18 A |
| 8,858,736 | B2 | * | 10/2014 | Larker ..................... C21D 5/00 148/321 |

FOREIGN PATENT DOCUMENTS

| | | |
|---|---|---|
| FR | 796710 | 4/1936 |
| GB | 526518 | 9/1940 |
| GB | 598421 | 2/1948 |

\* cited by examiner

SOLID WHEEL FOR A RAIL VEHICLE AND METHOD FOR PRODUCING THE WHEEL

CROSS-REFERENCE TO RELATED APPLICATIONS

This is a U.S. national stage of application No. PCT/EP2016/054529 filed 3 Mar. 2016 and claims the priority of Austrian application No. A50349/2015 filed Apr. 30, 2015, the content of which is incorporated herein by reference in its entirety.

BACKGROUND OF THE INVENTION

1. Field of the Invention

The invention relates to a solid wheel for a rail vehicle, comprising a wheel rim that is arranged on the circumference of the solid wheel, which comprises a tread, where the wheel rim is connected to a hub for a wheel set shaft via an end wall and a rear wall, where the hub is arranged in the center of the solid wheel and has a longitudinal axis, as well as a method for producing the solid wheel.

2. Description of the Related Art

Solid wheels for rail vehicles have already been known for many years. However, with solid wheels for rail vehicles there is the problem that sound emissions are undesirable in rail traffic, particularly in the case of rail vehicles traveling in the city, such as trams or metros. In addition, attempts are continually being made to keep the mass of the wheels as low as possible.

Sound absorbers that absorb sound due to their mass are known to reduce sound emissions, but they are only able to dampen the direct sound thereby and additionally increase the mass of the solid wheel. Multipart rubber-sprung wheels, which are costly to produce, are a further possibility for sound absorption.

SUMMARY OF THE INVENTION

In view of the foregoing, it is therefore an object of the invention to provide a solid wheel for a rail vehicle having a particularly high axial and radial stiffness to reduce the emission of direct sound and to permit a long service life and a low weight of the solid wheel.

This and other objects and advantages are achieved in accordance with the invention by a solid wheel for a rail vehicle, comprising a wheel rim that is arranged on the circumference of the solid wheel, which comprises a tread, where the wheel rim is connected to a hub for a wheel set shaft via an end wall and a rear wall, and where the hub is arranged in the center of the solid wheel and has a longitudinal axis, such that the solid wheel forms a cavity that is delimited by the end wall and the rear wall. In accordance with the invention, the end wall and the rear wall transition into each other below the wheel rim in an arched manner, where the end wall has first openings and the rear wall has second openings in order to open the cavity outward in a spoked manner.

The cavity is configured at least below the wheel rim in an arched manner, i.e., the inner surfaces of the end wall and the rear wall exhibit a path in the manner of the inside of the ribs of an arch. The cavity thus has no corners or edges at least below the wheel rim, which ensures good stability both in the radial and axial direction.

Accordingly, it is also expedient if the inner surfaces of the end wall and the rear wall above the hub transition into each other without corners or edges.

The openings in the end wall and the rear wall reduce the weight of the solid wheel in addition to the cavity and permit the production, preferably the casting, of the solid wheel.

Due to the openings in the end wall and the rear wall, only the spokes, which have the function of ribs in the arch formed by the cavity, remain from the end wall and the rear wall. The spokes in accordance with the invention are not spokes in the general sense, as set forth above. As a result, the spokes may also be denoted as ribs or connecting elements. In this regard, in each case a first spoke may be formed between two first openings on the end wall, and in each case a second spoke may be formed between two second openings on the rear wall, where the spokes each have their smallest width in the central third of the spoke. The width of the spokes in this case is measured in the plane of the end wall and/or rear wall in the circumferential direction of the wheel.

In other words, the first spoke comprises a first tapering which (viewed in the radial direction) is arranged in the central third of the first openings forming the first spoke. Similarly, the second spoke comprises a second tapering which (viewed in the radial direction) is arranged in the central third of the second openings forming the second spoke. The configuration of a smallest width of the spokes in the central third corresponds to a bionic design and homogenizes the stress in the spokes. Thus, locally at each point of the spoke a very high stress gradient is prevented, which as a whole leads to a low concentration of stress along the spokes.

This may be assisted by the spokes widening both inwardly and outwardly from their smallest width in the radial direction.

Relative to the first openings, i.e., those in the end wall, it has proved advantageous if the first openings have a first axis of symmetry and are configured to be substantially elliptical, where the first axis of symmetry intersects the longitudinal axis. The main axis of the ellipse that corresponds to the first axis of symmetry is thus aligned radially.

The first opening, however, does not have to represent an ellipse in a precise mathematical manner but the elliptical shape may be approximated by the circumference of the first openings being formed from a series of circle radii connected together tangentially. With the linked radii, concentrations of stress are further reduced and the flux of force through the spokes is deflected smoothly.

For the design of the dimensions of the first openings, the ratio of the greatest width of the first openings to the greatest length of the first openings is of great significance. If this ratio ranges between 1:1.5 and 1:2.5, preferably 1:1.8 and 1:2.2, high levels of stiffness may be achieved with particularly low material outlay and accordingly reduced weight. Here, the greatest length is measured in the radial direction and/or in the direction of the first axis of symmetry and the greatest width is measured in the circumferential direction and/or perpendicular to the first axis of symmetry.

Relative to the second openings, i.e., those in the rear wall, it has proved expedient if the second openings have a second axis of symmetry and are configured to be substantially egg-shaped, where the second axis of symmetry intersects the longitudinal axis. The egg-shaped second openings, and/or the largest diameter thereof, are thus also aligned radially.

By the egg shape of the second openings, the greatest width thereof (viewed in the radial direction) is not located centrally between the radial innermost point and the radial outermost point, but radially outside. This means that the second openings perpendicular to the second axis of symmetry have a maximum extent in a region that is offset radially in the direction of the tread relative to a central point of the second opening.

In order to further reduce the concentration of stress along the spokes, the circumference of the second openings is formed from a series of circle radii connected together tangentially.

Relative to the design of the egg-shaped second openings, it has proved expedient if the ratio between the innermost radius of the second openings relative to the longitudinal axis and the outermost radius of the second openings relative to the longitudinal axis ranges between 1:1.4 and 1:1.8, preferably between 1:1.5 and 1:1.7. The stress gradient along the second spokes is thus further reduced.

Also, for the structural design of the second openings the ratio of the greatest width of the second openings to the greatest length of the second openings is of great significance. If this ratio ranges between 1:1.5 and 1:2.5, preferably 1:1.8 and 1:2.2, a high level of stiffness with particularly low material outlay and accordingly reduced weight may also be achieved. Here, the greatest length is measured in the radial direction and/or in the direction of the second axis of symmetry and the greatest width is measured in the circumferential direction and/or perpendicular to the second axis of symmetry.

Generally, for reasons of the uniform distribution of forces, the first and second openings in the circumferential direction are arranged so as to be distributed symmetrically to the longitudinal axis and a pitch angle is present between two first openings. By the constant pitch angle and the uniform distribution about the longitudinal axis, a uniform radial stiffness of the solid wheel is achieved, so that eccentricities on the tread are substantially avoided.

Generally, for reasons of the uniform distribution of forces, the number of first openings and the number of second openings is the same, where the first openings may be offset relative to the second openings in the circumferential direction, in particular (for reasons of symmetry) by half of the pitch angle.

In order to reduce and/or to avoid the effects of resonance in vibrational modes of the solid wheel, in principle, it is advantageous if both the number of first openings and the number of second openings each corresponds to a prime number, preferably 11, 13 or 17.

The cavity of the solid wheel is preferably (in the sense of a simple production and a uniform distribution of the forces) a rotationally symmetrical volume that is formed by the rotation of a rotated cross section about the longitudinal axis.

For reasons of stability, the rotated cross section can be set to taper from the hub toward the tread. The end of the rotated cross section facing the tread is formed by the inner surfaces of the end wall and rear wall and/or the spokes remaining from the end wall and rear wall, and is intended to have the shape of an arch. In this regard, in one embodiment of the invention the end of the rotated cross section facing the tread is configured as a series of circle radii connected together tangentially.

In order to be able to ensure the load-bearing capacity of the wheel rim and the tread arranged thereon, in spite of the formation of the cavity, in a further embodiment of the invention the difference between a wheel radius of the wheel in the new state and a greatest radius of the rotated cross section is between 60 mm and 70 mm, preferably between 65 mm and 68 mm. "Wheel radius" is understood in this case as the nominal radius of the solid wheel determined in accordance with a manner known per se, where the greatest radius of the rotated cross section corresponds to that radius represented by the point of the rotated cross section furthest away from the longitudinal axis in the radial direction. In other words, the greatest radius corresponds to the distance of the apex of the arch from the longitudinal axis.

It may be provided that the maximum extent of the rotated cross section in a direction perpendicular to the longitudinal axis (i.e. radially) ranges from 50% to 60%, preferably 51% to 58%, of the wheel radius. In other words, the rotated cross section has a length (and thus the cavity has a radial dimension) which is 50% to 60%, preferably 51% to 58% of the wheel radius.

By an inclination of the outer surface of the end wall and/or rear wall with an increasing radius (which means the same as an inclination of the outer surfaces of the corresponding spokes with an increasing radius) the radial and axial stiffness of the solid wheel may be further increased. In this regard, the outer surface of that circular region of the end wall which has the first openings may be configured to be planar and encloses a first angle of inclination with the normal of the longitudinal axis.

Alternatively or additionally, the outer surface of that circular region of the rear wall that has the second openings may be configured to be planar and encloses a second angle of inclination with the normal of the longitudinal axis.

In order to adjust the position of the tread relative to the hub, in a particularly preferred embodiment of the invention the angle of inclination (i.e., both the first and the second angle of inclination) ranges between 0° and 10°, preferably between 1° and 6°.

In the case of the inclination of both the outer surface of the end wall and the outer surface of the rear wall, it has proved advantageous if the first angle of inclination (that of the end wall) is smaller than that of the second angle of inclination (that of the rear wall).

If the end wall and rear wall in the region of the cavity (and/or the spokes thereof), viewed in the radial direction, have no alteration to the thickness (i.e., the spacing between the inner and outer surface), then an inclination of the outer surface of the end wall and the rear wall (and/or the spokes thereof) also causes an inclination of the inner surface and thus a corresponding tapering of the rotated cross section (and/or of the cavity) radially outwardly.

In order to keep the weight of the solid wheel low and to improve the tribological properties, the solid wheel is designed in one piece as a cast part. The production of a cast part occurs substantially in one casting step, where at least one heat treatment is arranged downstream thereof to advantageously alter the structure of the cast part. Moreover, one-piece solid wheels have the advantage that no joints are present between the individual parts that may be subject to wear. The solid wheel could be produced, for example, from cast steel.

Some cast materials additionally have the advantage of having a lower specific weight than, for example, steel. In this case, for example, the material ADI might be cited.

The abbreviation ADI is also customary in German for so-called ausferritic cast iron with spheroidal graphite and in English is denoted as austempered ductile iron (ADI). ADI is an austempered-ferritic cast iron with spheroidal graphite and the mechanical properties of ADI are described, for example, in the European Standard EN 1564. ADI is a low-wear isothermally heat-treated cast iron with spheroidal graphite. It is characterized by a very advantageous combination of strength and elongation as well as high resistance to alternating stresses and good wear behavior. With regard to the solid wheel, the improved tribological properties, i.e., the reduced wear of the tread and the wheel flange, result in a markedly longer service life of a solid wheel in accordance with disclosed embodiments of the invention. In tests, a doubling of the service life relative to solid wheels produced in accordance with the prior art has already been observed.

Cast iron with spheroidal graphite serves as a basis for ADI.

In order to achieve the isothermal conversion without the formation of perlite or bainite, the molten metals intended for ADI are generally alloyed with small quantities of copper, molybdenum, manganese and nickel. Due to the required macro- and micro-homogeneity, high requirements are set for the quality of the ADI cast pieces.

The temperature of the isothermal conversion influences the resulting structure and as a result the mechanical properties of the cast pieces. The lower the temperature, the higher the resulting hardness and strength of the material (and/or the lower the residual austenite fraction).

The solid wheel in accordance with disclosed embodiments of the invention may be a cast part. Consequently, the invention also encompasses a method for producing the solid wheel, with the solid wheel being produced in one piece as a cast part.

The arched design of the end wall and rear wall below the wheel rim and the first and second openings offset relative to one another in the end wall and/or rear wall provide the wheel rim with high radial and axial stiffness, resulting in low sound emission of the solid wheel.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

For the further description of the invention, reference is made in the following part of the description to the figures, further advantageous embodiments, details and developments of the invention being able to be derived therefrom. The figures are to be understood by way of example and while they are intended to represent the character of the invention they in no way limit or reproduce the invention conclusively, in which.

DETAILED DESCRIPTION OF THE EXEMPLARY EMBODIMENTS

Figure 1:
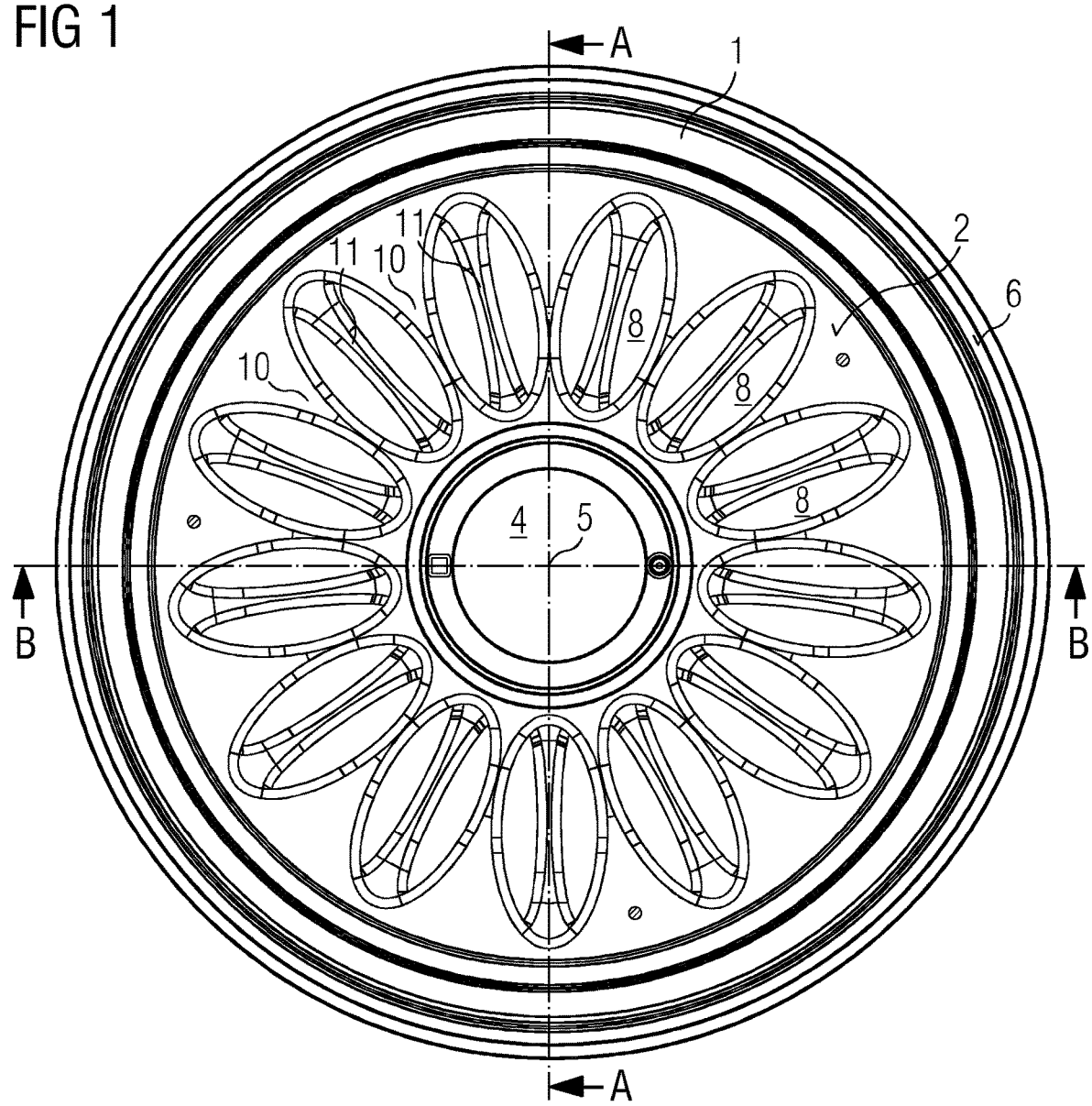
FIG. 1 shows a side view of the end face (end wall) of a solid wheel in accordance with the invention.

FIG. 1 shows a side view of an end wall 2 of an embodiment of a solid wheel in accordance with the invention for a rail vehicle. The solid wheel comprises a wheel rim 1 arranged on the circumference of the solid wheel and a hub 4 arranged in the center of the solid wheel for attaching a wheel set shaft. In this case, the hub 4 has a longitudinal axis 5 that corresponds to the rotational axis of the solid wheel. The wheel rim 1 and the hub 4 are connected on one side by the end wall 2 and on the other side by a rear wall 3, not visible in this view. In the installed state, the rear wall 3 corresponds to the side of the solid wheel facing the rail vehicle and the end wall 2 corresponds to the side of the solid wheel remote from the rail vehicle. In the radial direction, the wheel rim 1 is defined by the tread 6 which in the operating state, rolls on a rail.

Figure 2:
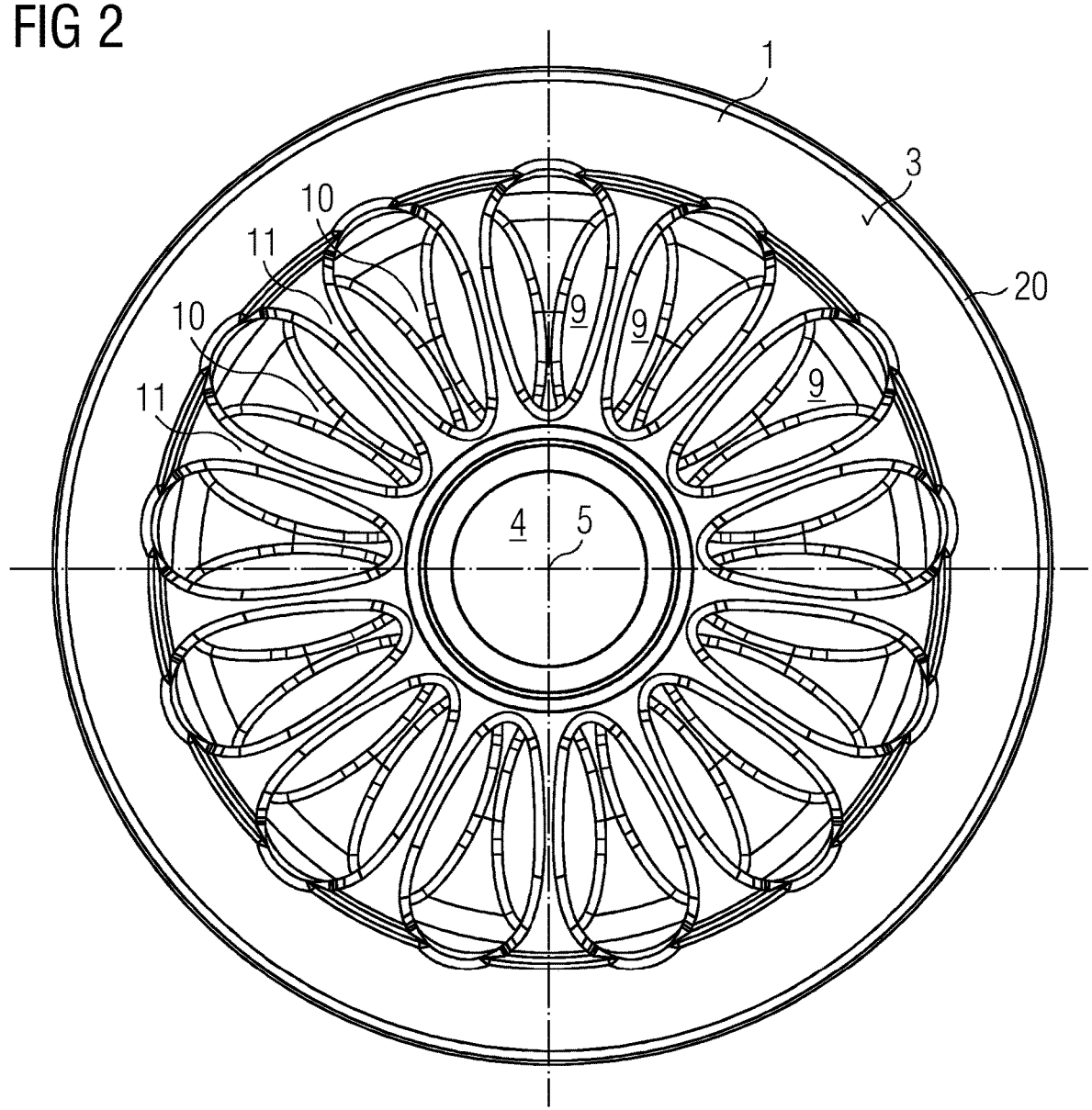
FIG. 2 shows a side view of the rear face (rear wall) of a solid wheel in accordance with the invention.
Figure 3:
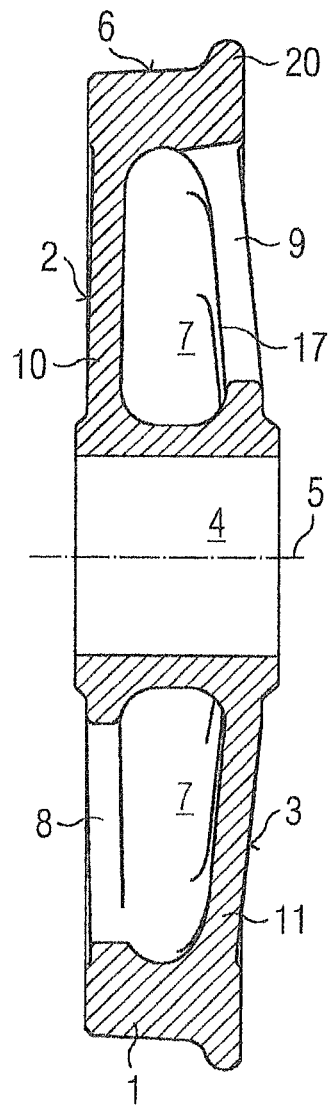
FIG. 3 shows a sectional view of a solid wheel in accordance with the invention along the line AA of FIG. 1.
Figure 4:
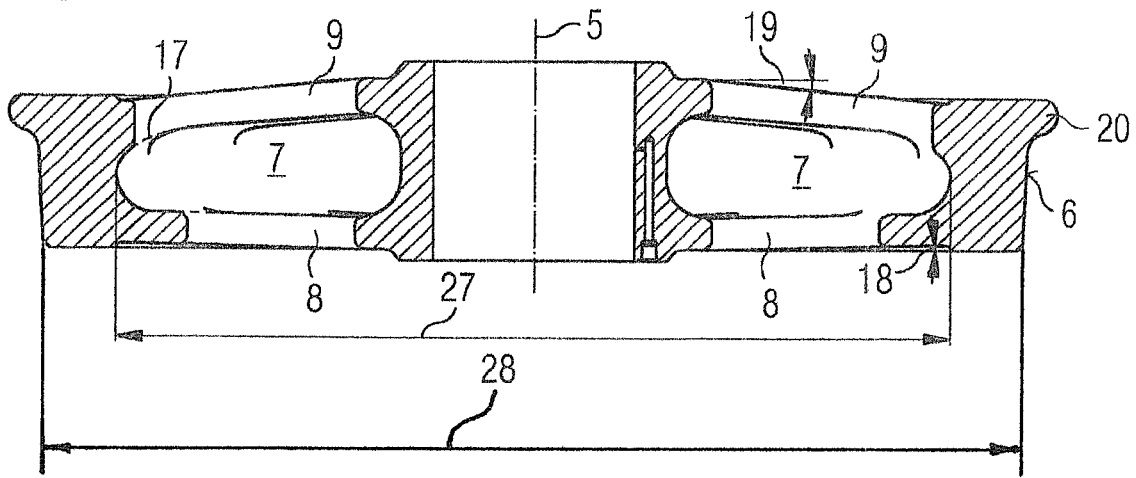
FIG. 4 shows a sectional view of a solid wheel in accordance with the invention along the line BB of FIG. 1

Between the wheel rim 1 and the hub 4 a cavity 7 is formed as shown in FIGS. 3 and 4, where the cavity is defined on the one side by the end wall 2, in particular by the first spokes 10 thereof, and on the other side by the rear wall 3, in particular by the second spokes 11 thereof, as may be seen in FIG. 2. Here, the first spokes 10 are produced by two first openings 8 that are arranged adjacent to one another in the end wall 2 and that penetrate the end wall 2 and thus open the cavity 7 outwardly.

The first openings 8 are configured to be substantially elliptical, where the main axis of each of the openings 8 is arranged radially. First spokes 10 are formed between the first openings 8, where the spokes have their smallest width (viewed in the radial direction) slightly inside the central point of the openings 8.

Thirteen first openings 8 are equally distributed around the circumference of the solid wheel. The second openings 9 that are located in the rear wall 3 are seen through the cavity 7, where in each case a second spoke 11 is located between two second openings 9. Here, the first openings 8 are offset in the circumferential direction relative to the second openings 9, such that the second spoke 11 (when viewed parallel to the longitudinal axis 5) in each case is arranged centrally in the first opening 8. Accordingly, for the arrangement of the first spokes 10 this has the result that each of the spokes are arranged centrally in the second opening 9 (see also FIGS. 5 and 6).

In FIG. 2, a side view of a solid wheel in accordance with the invention is illustrated with a view of the rear wall 3, where the second openings 9 may be seen in detail. Similarly to the first openings 8 and the first spokes 10, thirteen second openings 9 and an equal number of second spokes 11, which in turn are formed by in each case two second openings 9 in the rear wall 3, are arranged on the rear wall 3. In turn, these second openings 9 open the cavity 7 outwardly, toward the other side. Here, the second openings 9 are configured to be egg-shaped. Egg-shaped means that these second openings 9 are elongated, where the circumference has a longitudinal end with a smaller curvature and a longitudinal end with a larger curvature, and the curvatures of the two longitudinal ends are connected together lines that are curved to a lesser extent (at least less than the larger curvature of the one longitudinal end). Additionally, it may also be seen clearly that the tread 6 on the transition to the rear wall 3 comprises a wheel flange 20 as a safety means, which ensures the track guidance and therefore in this view conceals the tread 6.

FIG. 3 shows a sectional view of an embodiment of a solid wheel in accordance with the invention. This view clearly shows the construction of the solid wheel described in the introduction. Starting from the hub 4 arranged in the center, the wheel rim 1 arranged on the circumference is connected on the one side by the end wall 2 and on the other side by the rear wall 3. The cavity 7 is configured between the end wall 2, the rear wall 3, the hub 4 and the wheel rim 1, where the cavity is similar to the construction of an arch. On the end face 2, the cavity 7 is open outwardly in a spoked manner via the first openings 8, one thereof being able to be seen, where the first spokes 10 formed by the first openings 8, one thereof also being able to be seen in section, produce the connection between the hub 4 and the wheel rim 1. On the rear wall 3, the second openings 9 and the second spokes 11 are arranged in the same manner, where once again it is possible to clearly identify that first 10 and second spokes 11 are offset such that an opening 8, 9 on the one wall 2, 3 is centrally aligned with a spoke 11, 10 on the other wall 3, 2. The cavity 7 is a volume that is rotationally symmetrical about the longitudinal axis 5, and that is formed by the rotation of a rotated cross section 17 about the longitudinal axis 5. The cavity 7 has a larger dimension in the radial direction than in the axial direction. The end of the rotated cross section 17 facing the tread 6 is configured as a series of circle radii connected together tangentially. Here, the rotated cross section 17 tapers from the hub 4 in the direction of the tread 6. The tread 6 has a tread inclination.

The angle of inclination of the end wall 2 and the rear wall 3 are illustrated in FIG. 4. The outer surface of the end wall 2 (and/or the outer surface of the first spokes 10) has, in the region of the first openings 8, a first angle of inclination 18 of approximately 1-2° and is inclined inwardly toward the tread 6. The outer surface of the end wall 3 (and/or the outer surface of the second spokes 11) has, in the region of the second openings 9, a second angle of inclination 19 of approximately 5-7° and is also inclined inwardly toward the tread 6. Here, the second angle of inclination 19 is greater than the first angle of inclination 18. However, other embodiments are also conceivable in which the angles of inclination 18, 19 are of the same size or the first angle of inclination 18 is greater than the second angle of inclination 19.

The end of the rotated cross section 17 facing the tread 6, which is configured in an arched manner and thus has a curvature, has a greater curvature in the end wall 2 than in the rear wall 3, where it extends as a whole in a flatter/flattened manner.

The position of the rotated cross section 17 in the radial direction is substantially determined by the difference between a wheel radius 28, which is easy to determine by the person skilled in the art, and a greatest radius 27 of the rotated cross section. In this case, the greatest radius 27 refers to the spacing between the longitudinal axis 5 and the point of the rotated cross section 17 furthest away from the longitudinal axis 5 in the radial direction, i.e., in other words, the highest point of the end of the rotated cross section 17 configured in an arched manner and facing the tread 6. In the present exemplary embodiment, this difference is 65 mm.

The end of the rotated cross section 17 facing the wheel hub 4 is also rounded and, in the end wall 2, has as a whole a smaller curvature than in the rear wall 3. A linear portion that is parallel to the longitudinal axis 5 is present between the end wall 2 and the rear wall 3.

Depressions for relieving stress are provided in the region outside the wheel hub 4, both on the outer face of the end wall 2 and on the outer face of the rear wall 3. The end wall 2 and the rear wall 3 are offset inwardly thereby outside the wheel hub 4. Here, the depressions and/or the offsets start at the same radius as the cavity 7.

The maximum extent of the rotated cross section 17 in the radial direction, i.e., the spacing between the point of the rotated cross section 17 located furthest radially inwardly, in the present case this point is located on the portion of the rotated cross section 17 parallel to the longitudinal axis 5, and the greatest radius 27 of the rotated cross section 17, is dependent on the wheel radius 28. In the present exemplary embodiment, the maximum extent is approximately 57% of the wheel radius 28.

Figure 5:
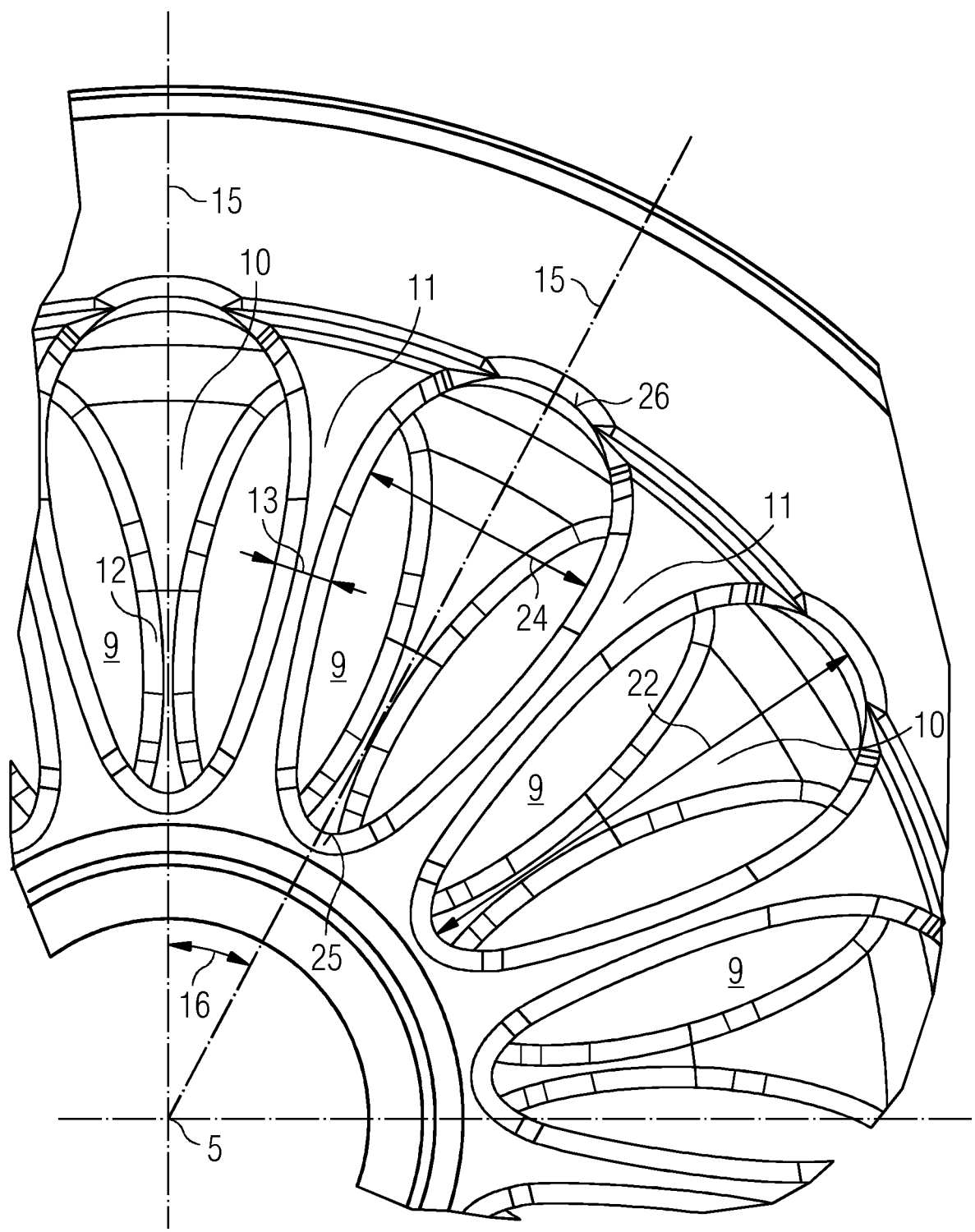
FIG. 5 shows a detailed view of second openings on the rear wall.

The egg-shaped second openings 9 may be seen in detail in FIG. 5, where the second openings are each symmetrical with an axis of symmetry 15. Here, the axes of symmetry 15 intersect the longitudinal axis 5 at a point and are offset relative to one another by a pitch angle 16. Thus the pitch angle 16 of 360°/13, thus approximately 27.7°, is produced between the second openings 9, a total of thirteen thereof being present.

The second openings 9 are arranged radially with their longitudinal direction, where the longitudinal end with the smaller curvature that forms an innermost radius 25 is located on the inside. On the opposing side, i.e., the longitudinal end located radially outwardly, the second openings 9 have a larger curvature which forms an outermost radius 26. Here, the ratio between the innermost radius 25 and the outermost radius 26 in the present exemplary embodiment is approximately 1:1.6.

The design of the second openings 9 is substantially determined by the greatest length 22 thereof and the greatest width 24 thereof and/or the ratio thereof to one another, where the circumference of the second openings 9 consists of a series of circle radii connected together tangentially. Here, the greatest length 22 is measured in the radial direction and/or in the direction of the axis of symmetry 15, while the greatest width 24 is measured in the circumferential direction and/or perpendicular to the axis of symmetry 15. The ratio of the greatest width 24 to the greatest length 22 in this case in the present exemplary embodiment is approximately 1:1.92. The portion with the greatest width 24 in this case is offset radially outwardly relative to the central point of the second openings 9 and located in the outer third.

The second spokes 11 formed between the openings 9 have their smallest width 13, viewed radially, approximately inside the central point of the openings 9.

Figure 6:
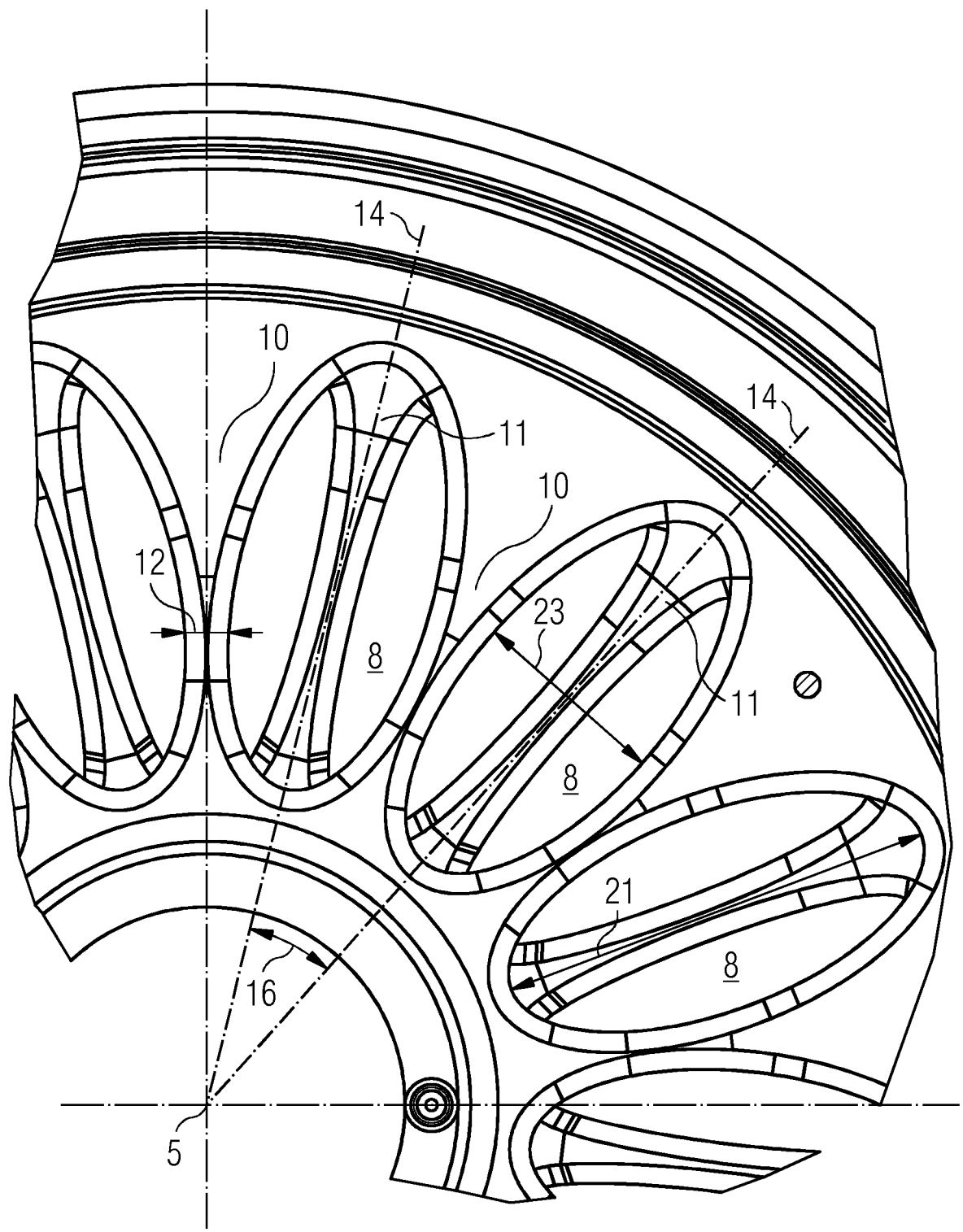
FIG. 6 shows a detailed view of first openings on the end wall.

The first openings 8 are shown again in detail in FIG. 6. Each first opening 8 has a first axis of symmetry 14 that extends radially. Between the thirteen first openings 8 a pitch angle 16 of 360°/13, thus approximately 27.7°, is produced. Between the first axes of symmetry 14 and the second axes of symmetry 15 an angle which corresponds to half of the pitch angle 16, i.e., approximately 13.85°, is produced by the offset of the openings 8, 9 relative to one another.

Moreover, the shape of the first openings 8 is determined by the greatest length 21 and greatest width 23 thereof and/or the ratio thereof to one another. Similarly, the circumference of the first openings 8 is formed from a series of circle radii connected together tangentially. Similarly to the second openings 9, the dimensions of the first openings 8 are also measured in the radial direction and/or in the circumferential direction. Here, the ratio between the greatest width 23 and the greatest length 21 in the present exemplary embodiment is approximately 1:2.1. In this case, the portion with the greatest width 23 is arranged approximately in the center of the first openings 8.

The first spokes 10 formed between the first openings 8 have their smallest width 12, viewed radially, within the central point of the openings 8, approximately on the boundary between the internal and central third.

The solid wheel shown in FIGS. 1 to 6 is shown to scale and in this case has a wheel diameter of 850 mm.

Figure 7:
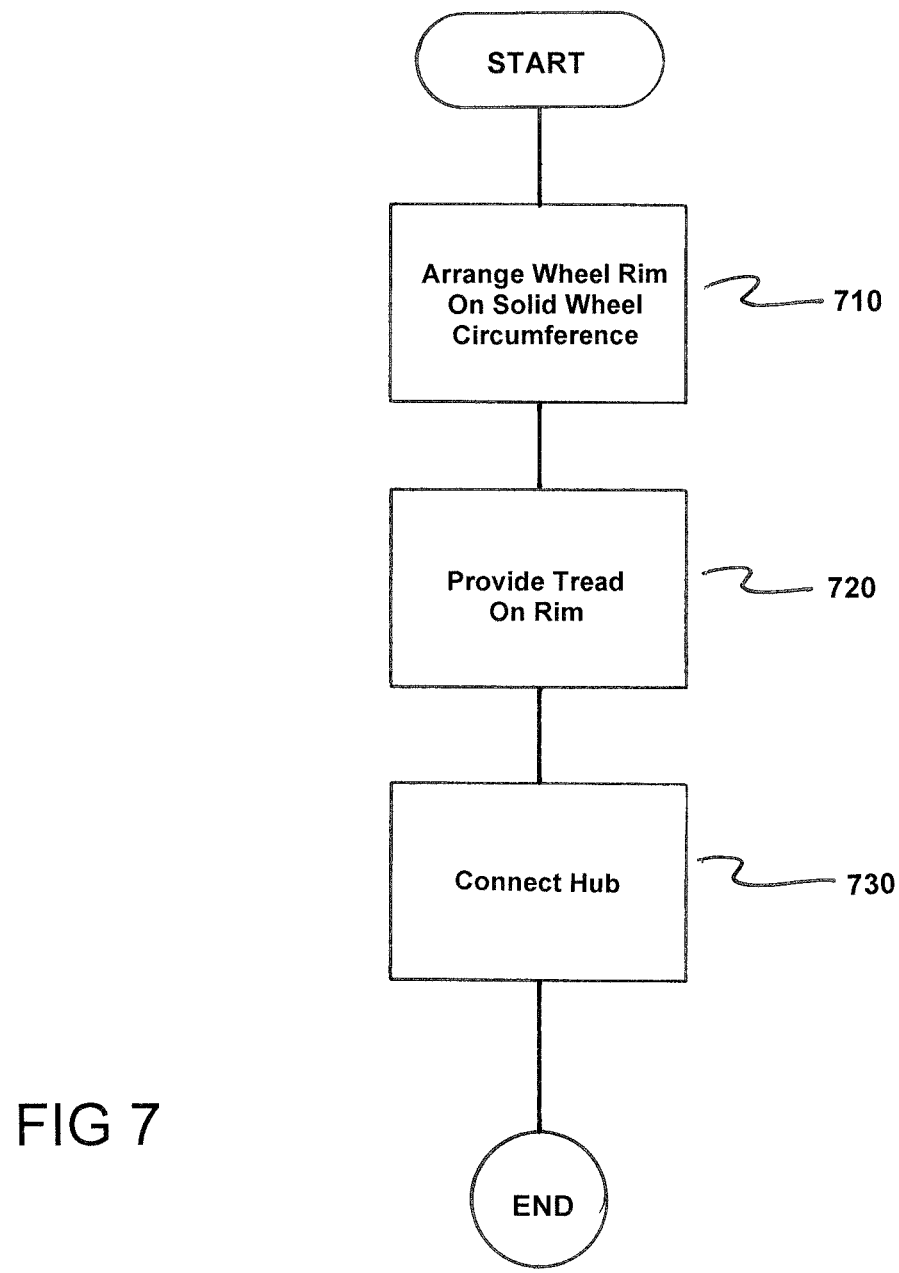
FIG. 7 is a flowchart of the method in accordance with the invention.

FIG. 7 is a flowchart of a method for producing a solid wheel. The method comprises arranging a wheel rim 1 on a circumference of the solid wheel, as indicated in step 710. Next, a tread 6 is provided on the rim, as indicated in step 720. Next, a hub for a wheel set shaft is now connected to the wheel rim 1 via an end wall 2 and a rear wall 3, as indicated in step 730. Here, the hub 4 is arranged at a center of the solid wheel and has a longitudinal axis 5.

In accordance with the invention, the solid wheel forms a cavity 7 that is delimited by the end and rear walls 2, 3. In addition, the end and rear walls 2, 3 transition into each other below the wheel rim 1 in an arched manner. Moreover, the end wall 2 has first openings 8 and the rear wall 3 has second openings 9 in order to open the cavity 7 outward in a spoked manner. In the preferred embodiment, the solid wheel is produced in one piece as a cast part.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A solid wheel for a rail vehicle, comprising:
a wheel rim arranged on a circumference of the solid wheel;
a tread; and
a hub for a wheel set shaft, the wheel rim being connected to the hub by an end wall and a rear wall, said hub being arranged at a center of the solid wheel and having a longitudinal axis;
wherein the solid wheel forms a cavity which is delimited by the end and rear walls;
wherein the end and rear walls transition into each other below the wheel rim in an arched manner;
wherein the end wall has first openings and the rear wall has second openings in order to open the cavity outwardly;
wherein the second openings have a second axis of symmetry and are configured to be substantially egg-shaped;
wherein the second axis of symmetry intersects the longitudinal axis; and
wherein the second openings, when perpendicular to the second axis of symmetry, have a greatest width in a region which is offset radially in a direction of the tread relative to a central point of the second opening.

2. The solid wheel as claimed in claim 1, wherein a first spoke is formed between two first openings on the end wall and a second spoke is formed between two second openings on the rear wall; and
wherein the first and second spokes each have a smallest respective width in a central third of a respective spoke.

3. The solid wheel as claimed in claim 2, wherein the first and second spokes widen both inwardly and outwardly from the smallest respective width in a radial direction.

4. The solid wheel as claimed in claim 1, wherein the first openings have a first axis of symmetry and are configured substantially elliptical; and wherein the first axis of symmetry intersects the longitudinal axis.

5. The solid wheel as claimed in claim 4, wherein a circumference of the first openings is formed from a series of circle radii tangentially connected together.

6. The solid wheel as claimed in claim 4, wherein a ratio of a greatest width of the first openings to a greatest length of the first openings ranges between 1:1.5 and 1:2.5.

7. The solid wheel as claimed in claim 5, wherein a ratio of a greatest width of the first openings to a greatest length of the first openings ranges between 1:1.5 and 1:2.5.

8. The solid wheel as claimed in claim 6, wherein the ratio ranges between 1:1.8 and 1:2.2.

9. The solid wheel as claimed in claim 7, wherein the ratio ranges between 1:1.8 and 1:2.2.

10. The solid wheel as claimed in claim 1, wherein a circumference of the second openings is formed from a series of circle radii connected together tangentially.

11. The solid wheel as claimed in claim 10, wherein a ratio between an innermost radius of the second openings relative to the longitudinal axis and an outermost radius of the second openings relative to the longitudinal axis ranges between 1:1.4 and 1:1.8.

12. The solid wheel as claimed in claim 11, wherein the ratio ranges between 1:1.5 and 1:1.7.

13. The solid wheel as claimed in claim 1, wherein the ratio of the greatest width of the second openings to the greatest length of the second openings ranges between 1:1.5 and 1:2.5.

14. The solid wheel as claimed in claim 13, wherein the ratio ranges between 1:1.8 and 1:2.2.

15. The solid wheel as claimed in one claim 1, wherein the first and second openings are arranged in the circumferential direction so as to be distributed symmetrically to the longitudinal axis and a pitch angle is present between two first openings.

16. The solid wheel as claimed in claim 15, wherein a number of the first and second openings is the same.

17. The solid wheel as claimed in claim 15, wherein a number of first and second openings each corresponds to a prime number.

18. The solid wheel as claimed in claim 16, wherein the number of first and second openings each corresponds to a prime number.

19. The solid wheel as claimed in claim 17, wherein the prime number is 11, 13 or 17.

20. The solid wheel as claimed in claim 18, wherein the prime number is 11, 13 or 17.

21. The solid wheel as claimed in claim 16, wherein the first openings are offset relative to the second openings in the circumferential direction.

22. The solid wheel as claimed in claim 21, wherein the first openings are offset relative to the second openings by half of a pitch angle.

23. The solid wheel as claimed in of claim 1, wherein the cavity is a rotationally symmetrical volume which is formed by rotation of a rotated cross section about the longitudinal axis.

24. The solid wheel as claimed in claim 23, wherein the rotated cross section tapers from the hub toward the tread.

25. The solid wheel as claimed in claim 23, wherein an end of the rotated cross section facing the tread is configured as a series of circle radii connected together tangentially.

26. The solid wheel as claimed in claim 23, wherein a difference between a wheel radius and a greatest radius of the rotated cross section is between 60 mm and 70 mm.

27. The solid wheel as claimed in claim 24, wherein a difference between a wheel radius and a greatest radius of the rotated cross section is between 60 mm and 70 mm.

28. The solid wheel as claimed in claim 26, wherein the difference is between 65 mm and 68 mm.

29. The solid wheel as claimed in claim 27, wherein the difference is between 65 mm and 68 mm.

30. The solid wheel as claimed in claim 23, wherein a maximum extent of the rotated cross section in a direction perpendicular to the longitudinal axis ranges from 50% to 60% of a radius of the wheel.

31. The solid wheel as claimed in claim 23, wherein the maximum extent ranges from 51% to 58% of the radius of the wheel.

32. The solid wheel as claimed in claim 1, wherein an outer surface of that circular region of the end wall having the first openings has a planar configuration and encloses a first angle of inclination with respect to the longitudinal axis.

33. The solid wheel as claimed in claim 1, wherein an outer surface of that circular region of the rear wall having the second openings has a planar configuration and encloses a second angle of inclination with respect to the longitudinal axis.

34. The solid wheel as claimed in claim 32, wherein the angle of inclination ranges between 0° and 10°.

35. The solid wheel as claimed in claim 33, wherein the angle of inclination ranges between 0° and 10°.

36. The solid wheel as claimed in claim 34, wherein the angle of inclination ranges between 1° and 6°.

37. The solid wheel as claimed in claim 35, wherein the angle of inclination ranges between 1° and 6°.

38. The solid wheel as claimed in claim 1, wherein the solid wheel is formed in one piece as a cast part.

39. The solid wheel as claimed in claim 38, wherein the solid wheel is produced from ausferritic cast iron with spheroidal graphite.

40. A method for producing a solid wheel, comprising:
arranging a wheel rim on a circumference of the solid wheel;
providing a tread on the rim; and
connecting a hub for a wheel set shaft to the wheel rim by an end wall and a rear wall, said hub being arranged at a center of the solid wheel and having a longitudinal axis;
wherein the solid wheel forms a cavity which is delimited by the end and rear walls;
wherein the end and rear walls transition into each other below the wheel rim in an arched manner; and
wherein the end wall has first openings and the rear wall has second openings in order to open the cavity outwardly;
wherein the solid wheel is produced in one piece as a cast part;
wherein the second openings have a second axis of symmetry and are configured to be substantially egg-shaped;
wherein the second axis of symmetry intersects the longitudinal axis; and
wherein the second openings, when perpendicular to the second axis of symmetry, have a greatest width in a region which is offset radially in a direction of the tread relative to a central point of the second opening.

* * * * *